July 14, 1959
S. A. B. HAMILTON
2,894,442
AIR CIRCULATING DEVICE FOR AUTOMOBILES
Filed Aug. 15, 1956
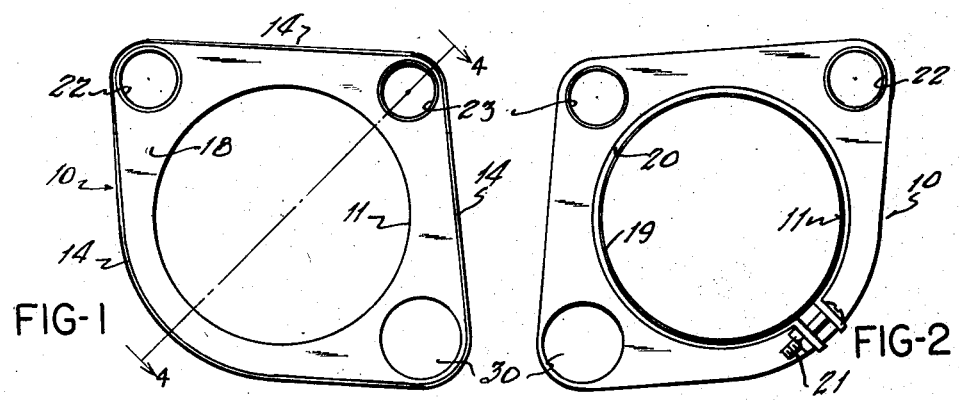
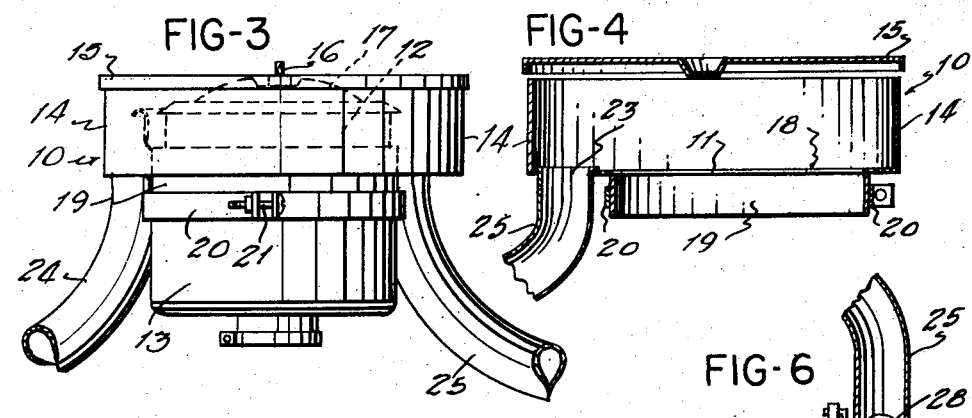
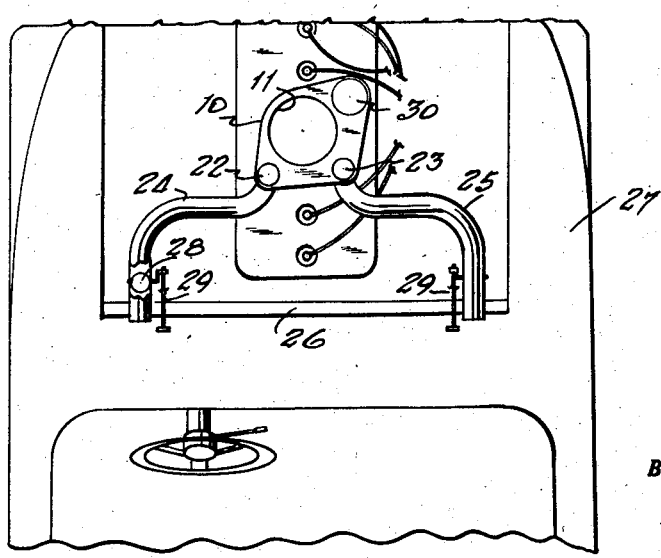
SAMUEL A. B. HAMILTON
*INVENTOR.*
BY *Cecil L. Wood*
ATTORNEY

United States Patent Office 2,894,442
Patented July 14, 1959

2,894,442
AIR CIRCULATING DEVICE FOR AUTOMOBILES

Samuel A. B. Hamilton, Fort Worth, Tex.

Application August 15, 1956, Serial No. 604,215

1 Claim. (Cl. 98—2)

This invention relates to ventilating and air circulating devices for the interior of automobiles, whereby fresh outside air can be circulated through the vehicle while the doors and windows thereof are closed, and the principal object of the invention resides in the provision of apparatus adapted to be installed on the conventional carburetor air filter device of the vehicle attached to the ordinary down draft carburetor unit under the hood, and having air ducts connected thereto.

An object of the invention is that of providing a simple and economical unit capable of ready attachment to the conventional air filter device by which, when atmospheric air is drawn into the carburetor of the vehicle by reason of the normal function of the air intake duct thereof, the air is drawn through the interior of the vehicle instead of from the usual outside source providing a dual function, i.e., that of supplying the required carburetor air intake and the withdrawal of impure and undesirable air in the vehicle.

The invention affords, among its several objects, the provision of an existing source of air impulsion provided by the fuel supply system of the vehicle, a source which is ever present in every conventional automobile motor, obviating the necessity for air moving devices such as fans, blowers, and the like, which require some type of motor for propulsion, thus involving an additional energy supply which must be imposed upon the battery of the vehicle.

Another object of the invention resides in the provision of a simple attachment to an automobile, whether or not equipped with any type of air conditioning or cooling system, by which the air in the interior thereof can be maintaned in fresh and pleasant condition, removing any monoxide fumes which may be present therein, as well as stale air and unpleasant odors of cigarette or cigar smoke, and the like, in all seasonal conditions, and controlling the air currents flowing through the vehicle in the presence of the occupants without opening the windows, and minimizing the accumulation of moisture or fog on the glass which often occurs during seasons and conditions where humidity is prevalent in the atmosphere.

Broadly, the invention contemplates the provision of a unit of simple design capable of detachable securement to the air cleaning device supplied as ordinary equipment for automobile motors having "down draft" carburetors, and capable of communication by suitable conduits or ducts to the interior of the vehicle body by which atmospheric air, generally drawn into the carburetor through the air cleaner unit, can be moved through the vehicle body thus serving the dual purpose of supplying the air from the fuel system of the vehicle and circulating the atmosphere, present in the vehicle body, to maintain the same in a pleasant state.

While the foregoing objects are paramount, other and lesser objects will become manifest as the description proceeds, taken in connection with the appended drawings wherein:

Figure 1 is a top plan view of apparatus embodying the invention with the cover removed.

Figure 2 is a bottom plan view of the apparatus shown in Figure 1.

Figure 3 illustrates the invention, as shown in Figures 1 and 2, applied to an air filter unit, a portion of which is shown in dotted lines, and fragmentarily showing the air ducts connected to the invention.

Figure 4 is a transverse sectional view on lines 4—4 of Figure 1, showing one of the conduits, the detachable cover, and the attaching band.

Figure 5 schematically illustrates the motor of a vehicle and the manner in which the invention is attached thereto, and showing the ducts connected to the device, and Figure 6 fragmentarily illustrates, in longitudinal section, one of the ducts having a valve therein for controlling the air flow.

The invention is designed to fit over the conventional air cleaner or filter installed in the standard automobile so that air drawn into the vehicle fuel system can be circulated through the vehicle body instead of from the atmosphere under the vehicle hood in the usual manner. It is a known fact that considerable draft is present through the carburetor of the conventional automotive motor, or in the fuel injection system of diesel motors. This energy can be utilized to aerate or circulate the air in an automobile body to evacuate stale atmosphere and unpleasant odors whether or not the vehicle has an air conditioning or cooling system.

In accordance with the invention the prime element comprises a hood or manifold 10 which may have any desired or suitable outline in plan, such as the form shown in Figures 1, 2 and 5, and having a central opening 11 adapted to receive the upper portion 12 of the conventional air filter device 13 of the vehicle. The air filter device 13 differs in form in the several standard makes of automobiles but in no significant detail which cannot be met in shaping the member 10 to conform thereto. It is contemplated that the hood or manifold 10 may be so constructed, by providing the necessary air filtering materials, to actually replace the conventional filter 13 and thus serve a dual purpose.

The member 10 is shown herein as having sides 14 whose depth affords a complete closure for the upper portion 12 of the filter 13, shown in Figure 3 partially in dotted lines, and a conforming lid or cover 15 is applied and secured by the wing nut 16 which is a conventional part of the filter 13 to secure its cover 17. Depending below the bottom 18 of the member 10 is a circular flange 19 which is split on one side and has a band 20 therearound by which the manifold 10 is rigidly secured to the filter 13 by screws or bolts 21, as shown in Figures 3 and 4.

The conventional filter 13 has openings about its upper portion 12 through which air is drawn into the carburetor in substantial quantities and relatively great force. When the manifold 10 is attached to the filter 13 and surrounds these openings air entering the filter 13 must pass through the member 10, entering through the openings 22 and 23 into which are secured conduits 24 and 25, respectively, as shown in Figures 3, 4 and 5. The opposite ends of the conduits 24 and 25 are connected through the fire wall 26 of the vehicle 27 and communicate with the interior thereof, as shown in the schematic illustration in Figure 5.

Each of the conduits 24 and 25 has a valve 28 therein, with suitable operating levers 29, by which air circulation from the interior of the vehicle body can be properly controlled. In order, however, to prevent serious reduction of air flow into the filter 13, which might tend to impair the proper operation of the carburetor, an opening 30 is provided in the bottom of the manifold 10 to admit a sufficient air supply to the carburetor whether or not air can flow through the conduits 24 and 25 due to the closing of the valves 28.

It is apparent, therefore, that the air interiorly of a vehicle can, by the use of the invention, be maintained in normally clean condition even while the windows of the vehicle are open, or during inclement weather when the windows are closed, aiding in preventing the accumulation of fog or moisture on the glass. Under ordinary driving conditions the air pressure within the vehicle may be maintained at slightly less than normal atmospheric pressure.

The invention may obviously be modified as to structure and design, by persons skilled in the art, without departing from the spirit and intent of the invention or the scope of the appended claim.

What is claimed is:

In an automotive vehicle, the combination of a down draft carburetor having an upstanding air intake pipe, an air filter having a vertically disposed cylindrical casing positioned above the intake pipe and in fluid communication therewith, the lower end of the casing surrounding the upper end of the intake pipe and having means clamping it thereto whereby the casing is supported on the intake pipe, the casing having a removable top cover and inlet openings about its upper portion for the admission of air, a manifold surrounding the upper portion of the filter casing and in fluid communication with the inlet openings, the manifold having a bottom, a peripheral side wall and a removable top cover, a central opening in the bottom of the manifold having the filter casing received therein, an integral flange surrounding the central opening and depending from the bottom of the manifold, clamping means coacting with the flange to secure the manifold to the filter casing, a pair of ducts connected to the manifold and in fluid communication with the passenger compartment of the vehicle whereby the manifold may be supplied with air from the passenger compartment, a valve in each of the ducts operable from the passenger compartment, and an opening in the manifold in fluid communication with the engine compartment of the vehicle whereby the manifold may be supplied with air independently of the ducts.

References Cited in the file of this patent

UNITED STATES PATENTS

| 1,774,352 | Bull | Aug. 26, 1930 |
| 2,112,101 | Kliesrath | Mar. 22, 1938 |
| 2,158,380 | Priess | May 16, 1939 |
| 2,227,927 | Downs | Jan. 7, 1941 |
| 2,788,086 | Sebok | Apr. 19, 1957 |

FOREIGN PATENTS

| 607,531 | France | Mar. 27, 1926 |